EGIL K. BJORNERUD
GLENN L. KEISTER
INVENTORS

BY Seed, Berry, Downey

ATTORNEYS

United States Patent Office 3,736,261
Patented May 29, 1973

3,736,261
METHOD FOR THE PRODUCTION OF STABLE WATER FOGS USING AN EMULSIFIED WATER-EVAPORATION RETARDING CHEMICAL MIXTURE
Egil K. Bjornerud and Glenn L. Keister, Seattle, Wash., assignors to Applied Technology Corporation, Seattle, Wash.
Filed Dec. 12, 1969, Ser. No. 884,560
Int. Cl. C09k 3/30
U.S. Cl. 252—305                      16 Claims

ABSTRACT OF THE DISCLOSURE

Stable water fogs are made by heating an emulsified mixture of two immiscible liquids, water and a long-chain monohydric fatty alcohol above the melting point of the fatty alcohol. The water and fatty alcohol evaporate at a rate proportional to their respective vapor pressures at the temperature to which the mixture is heated. The emulsifier may be an anionic, cationic, or non-ionic surfactant or a mixture of such surfactants. Electrolytes may also serve as the emulsifying agent. Preferably a buffer is added to the water-alcohol mixture in amounts sufficient to give a pH of 7 or above.

The emulsified water-fatty alcohol mixture is heated by hot combustion gases from a removable combustion unit placed in a container of water.

BACKGROUND OF THE INVENTION

Field of the invention

This invention relates to a method of producing stable water fogs.

Prior art relating to the invention

Stable water fogs made by coating water droplets with an evaporation retarding chemical such as n-hexadecanol and other long chain, monohydric fatty alcohols are known. Various processes have also been described for producing stable fogs. Reference is made, for example, to a publication by H. Eisner et al, "The Stabilization of Water Mists by Insoluble Monolayers," Discussions Faraday Society, No. 30, p. 86, 1960. As described in the publication an atomizing nozzle is used to form droplets containing both fatty alcohol and water from a dispersion of a mixture of fatty alcohol in water. The amount of water must be equal to that required to coat the water droplets.

Reference is also made to application Ser. No. 788,026, entitled "Method of Generating Stable Fogs," now U.S. Pat. No. 3,654,175 assigned to the assignee of the present application. There is disclosed a method of producing stable water fogs by heating a mixture of water and a long chain monohydric fatty alcohol to produce steam and fatty alcohol vapors, and condensing the steam and fatty alcohol vapors together, the fatty alcohol forming a compressed monolayer around the condensed water droplets. Heating of the mixture is accomplished with a submerged flame burner.

In the generation of stable water fogs, the evaporation rate of the long chain, monohydric fatty alcohol for a particular combustion unit must be adequate to coat the condensed water droplets. If the evaporation rate is not adequate the efficiency of the process and the volume of stable fog produced is reduced. It has been found that the evaporation rate of long chain monohydric fatty alcohols such as n-hexadecanol can be increased using the combustion unit described if the fatty alcohol is in emulsion.

One of the problems associated with use of submerged flame burners for production of stable water fogs is degradation of the fatty alcohol. Long chain, monohydric fatty alcohols, such as n-hexadecanol, are subject to decomposition and degradation at high temperatures and in acidic solution. A major amount of degradation occurs at the water-alcohol-air interface where the hot combustion gases from the submerged flame burner enter the water. Degradation is reduced when the fatty alcohol is in emulsion as the amount of the fatty alcohol at the water-fatty alcohol-air interface where the hot combustion gases enter the water is significantly reduced.

SUMMARY OF THE INVENTION

Stable water fogs are formed by heating an emulsified mixture of water and a water-immiscible evaporation retarding chemical above the melting point of the evaporation retarding chemical to produce water vapor and evaporation retarding chemical vapor, and condensing the water vapor and evaporation retarding chemical vapor together, thereby forming a saturated monolayer around the condensed water droplets. The ratio of evaporation rates of evaporation retarding chemical to water can be controlled, thereby controlling the size of the coated fog, by varying the amount of emulsifier and the rate at which the evaporation retarding chemical is loaded into the evaporator unit. The ratio of the vapor pressures of water and evaporation retarding chemical sets an upper limit to the evaporation ratio. To disperse the evaporation retarding chemical throughout the water an electrolyte or an organic anionic, cationic, or non-ionic surfactant is added to the water in amounts sufficient to disperse the evaporation retarding chemical throughout the water. A buffer or buffers are preferably added to the mixture to keep the pH of the mixture at 7 or above, thereby minimizing degradation of the evaporation retarding chemical. Sequestering or chelating agents may also be added, when hard water is used, to prevent metal ions present in the hard water from precipitating cations produced by the buffer.

It is a primary object of this invention to produce stable water fogs by heating an emulsified mixture of water and a long chain, monohydric fatty alcohol and condensing the two materials together.

It is a further object of this invention to provide an evaporator unit for the production of stable water fogs.

It is a further object of this invention to provide a method of producing stable water fogs by passing the gaseous combustion products of a submerged flame burner directly into an open top container of a water-evaporation retarding chemical emulsion to produce water vapor and chemical vapor which subsequently condense together, heat exchange of the hot gaseous combustion products and the emulsion increased by passing the hot combustion gases and emulsion upwardly in an annular space between the combustion tube and shroud of the combustion unit. It is a further object of this invention to provide a method of coating water droplets with an evaporation retarding chemical wherein the evaporation ratio of the evaporation retarding chemical to water can be controlled, thereby controlling the coated water droplet size.

DETAILED DESCRIPTION OF THE INVENTION

Figure 1:
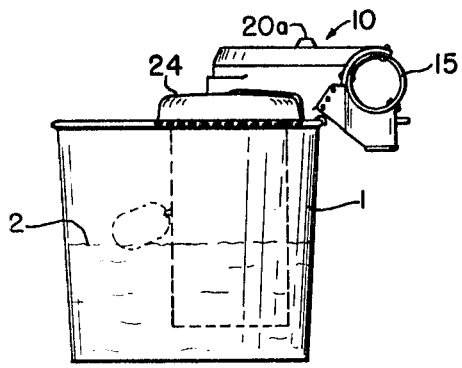
FIG. 1 is a side elevational view of an evaporation unit including a container in which is suspended a combustion unit for heating an emulsified mixture of water and an evaporation retarding chemical to produce stable water fogs.
Figure 2:
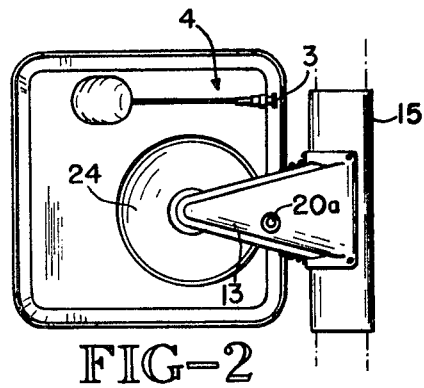
FIG. 2 is a top elevational view of the unit of FIG. 1.
Figure 3:
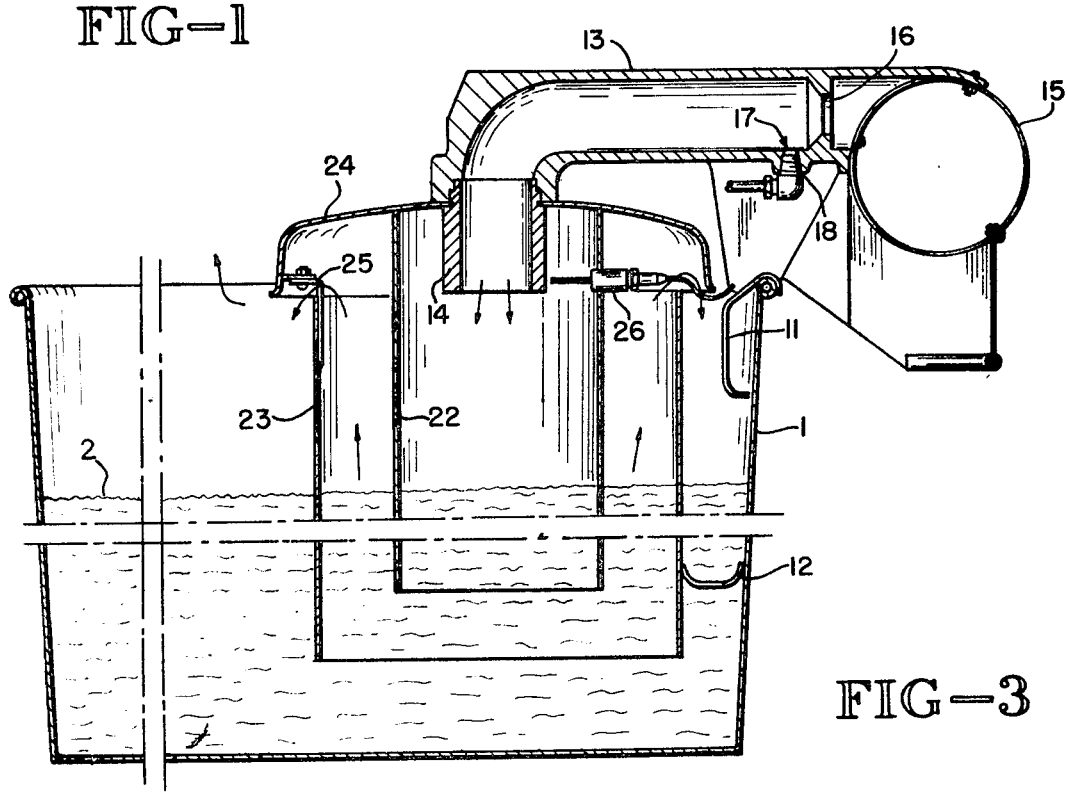
FIG. 3 is a cross sectional view along section line 3—3 of FIG. 2.

Stable water fogs are particularly useful in providing frost protection for growing crops. As described in U.S. Patent No. 3,654,175, mentioned previously, it is known to heat a mixture of water and a water-immiscible long chain, monohydric fatty alcohol such as n-hexadecanol to vaporize the two materials and recondense the vaporous water and alcohol to form coated water droplets. Above the melting point of the long chain fatty alcohol, water and the fatty alcohol evaporate at a rate proportional to their respective vapor pressures. As the water vapor and fatty alcohol vapors move into a zone of lower temperature they condense together at substantially the same time and in substantially the same ratio at which they were evaporated, the fatty alcohol forming a compressed monomolecular layer around the condensed water droplets, thereby reducing the rate of evaporation thereof.

The most efficient way of heating the water evaporation retarding chemical mixture for large scale use to protect growing crops is by a submerged flame burner wherein the gaseous combustion products are passed directly into the water to be heated. The gaseous combustion products comprise essentially water vapor and carbon dioxide plus the nitrogen present in the inlet air stream. When the carbon dioxide produced by combustion is passed through water carbonic acid is produced which lowers the pH of the aqueous solution causing decomposition and degradation of long chain fatty alcohols such as n-hexadecanol. It is, therefore, preferred to add a buffer compound or compounds in amounts sufficient to keep the pH of the mixture at 7 or above.

Water-immiscible, monohydric, long chain fatty alcohols have been used to coat water droplets and water surfaces to retard and reduce evaporation thereof. The most commonly used alcohol for this purpose has been n-hexadecanol, although other alcohols containing at least 16 carbon atoms such as octadecanol or mixtures of n-hexadecanol and octadecanol can be used. Each of these alcohols is characterized by a long carbon chain terminated with a hydroxyl group. These hydroxyl groups have the capability of hydrogen bonding with water and water droplets. When they do so the molecules of alcohol orient themselves perpendicular to the surface of the water droplets. When a great many of the molecules become packed together they form a monomolecular layer which acts as a semi-permeable barrier around the drops to reduce their rate of evaporation. When the droplets are substantialy coated with a monomolecular film of the perpendicularly oriented alcohol molecules the water droplets are said to be coated with a "saturated or compressed monomolecular layer." N-hexadecanol or cetyl alcohol, the preferred alcohol of this invention, has a melting point of around 49° C. and a boiling point at atmospheric pressure of 344° C.

N-hexadecanol, in its solid state, has a specific gravity less than that of water and, therefore, floats on the surface of the water and is immiscible therewith. To more efficiently use the n-hexadecanol it is one of the purposes of this invention to disperse the n-hexadecanol throughout the water with emulsifier or emulsifiers. Long chain, monohydric fatty alcohols such as n-hexadecanol can be dispersed in water to form an oil-in-water emulsion by the use of proper amounts of emulsifying agents such as organic anionic, cationic, or non-ionic surfactants, or mixtures of the foregoing. Also electrolytes such as sodium carbonate or sodium borate can be used as the emulsifying agent. Emulsifying agents which may be used include any of those capable of dispersing a long chain, monohydric fatty alcohol having 16 or more carbon atoms, such as n-hexadecanol, in water to form an oil-in-water emulsion. In areas where "hard" water is found and used to produce the stable fogs it is preferred to use non-ionic emulsifiers such as polyoxyethylene sorbitan mono-oleate ("Tween 80") and other such emulsifying agents.

When using n-hexadecanol as the evaporation retarding chemical the organic emulsifier, or combination of emulsifiers, whether ionic, cationic or non-ionic, should have a hydrophobiclipophilic balance (HLB) of between 14.5 and 15.5. "Tween 80" (polyoxyethylene sorbitan mono-oleate) has an HLB of 15. "Emulphor ON–870" (a polyoxyethylene fatty alcohol mixture) has an HLB of 15.4. If other long chain, monohydric fatty alcohols are used or mixtures of such alcohols the HLB required to emulsify will vary and can be calculated by addition of the HLB numbers of the emulsifiers used according to the formula:

$$(HLB)_1 \times (\%)_1 + (HB)_2 \times (\%)_2 + \ldots (HLB)_n \times (\%)_n = 100\% \times HLB$$

requirement of the fatty alcohol or alcohols used.

Antifoaming agents may be added to the emulsifying agent or emulsified mixture to reduce the foaming. Silicone antifoaming agents such as AF10 sold by Dow Chemical may be used.

As mentioned previously long chain, monohydric fatty alcohols such as n-hexadecanol are subject to degradation in acidic solution at high temperatures. When the water-alcohol mixutre is heated with a submerged flame burner the hot gaseous combustion products include carbon dioxide which, when it contacts the water, produces carbonic acid which tends to degrade the fatty alcohol at the gas-water interface where temperatures greater than about 130° C. are encountered. To counter this a buffer compound or compounds, either inorganic or organic, are added to the water in amounts sufficient to give a mixture having a pH of 7 or greater. The buffer may be one or more of any of the conventional organic or inorganic buffer compounds such as sodium carbonate, sodium borate or triethanolamine. When hard water is used it may be necessary to add a sequestering or chelating agent to prevent the metal ions present in hard water (usually calcium and magnesium ions) from precipitating the cations produced by the buffer. The amount of sequestering agent should be that sufficient to prevent such precipitation. Conventional sequestering agents such as the sodium salt of ethylenediaminetetra-acetic acid or other chelating compounds may be used.

Referring now to the evaporator unit preferably used to generate the stable fogs of this invention, reference numeral 1 designates a container 1, the top of which is open to the atmosphere. Containers of various sizes and shapes may be used with the one illustrated being square and tapered for ease of locating the water level control and for allowing stacking of the containers. The water level indicated by reference numeral 2 and water volume are important to the proper operation of the combustion unit. Water enters into container 1 through water inlet 3. The water level is controlled by a conventional float valve 4 or other suitable device. Within container 1 is suspended a combustion unit 10 of the submerged type. The embodiment illustrated is removable and is supported in container 1 by a hinge 11 secured to the combustion unit and adapted to fit over the lip of container 1 so that it can be tilted out of the water when necessary. To maintain the combustion unit in the vertical position a stop 12 of metal or other suitable material rests against one side of the container.

Figure 4:
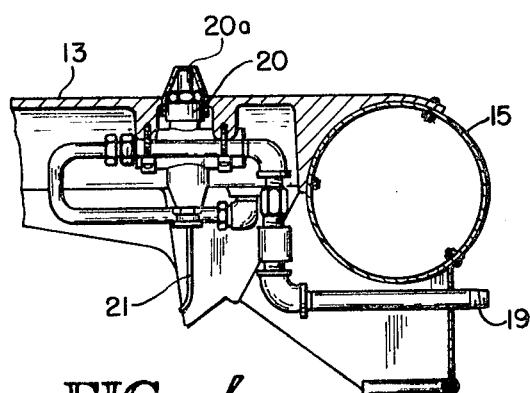
FIG. 4 is a partial sectional view along section line 4—4 of FIG. 2.

The combustion unit 10 includes a hollow cast manifold or mixing tube 13 open at both ends having a diameter that prevents flame flash-back. A burner nozzle 14 is secured to one end of the manifold. The other end of the manifold is secured to an air supply conduit 15. The manifold 13 also includes an air orifice 16 integral therewith and sized appropriately. Adjacent air orifice 16 and on the downstream side thereof is fuel inlet 17. Fuel is supplied to the combustion unit through fuel nozzle 18 attached to a suitable gas inlet conduit 19. Referring to FIG. 4 the gas inlet conduit 19 is connected to the gas nozzle through a safety valve 20 operated by thermocouple 21. A rubber boot covers button 20a which actuates valve 20.

The air orifice size and mixing chamber length are selected to allow the combustion unit to operate at pressures below 1 p.s.i. with sufficient stability to make the unit relatively insensitive to air and fuel variations. Air orifice 16 also distributes incoming air between parallel units when a number of units are used with a single air supply. The particular size air orifice, mixing tube, combustion tube and shroud are arranged with the fuel inlet to provide a combustion system that allows reasonably constant fuel-air mixture to be furnished to the combustion zone substantially independent of transient pressure variations occurring in the combustion zone. It is very important that the combustion tube diameter be large enough to allow the flame to flash back up the tube to seat on the edge of the burner nozzle.

Surrounding burner nozzle 14 is a downwardly extending combustion tube 21, the lower end of which is located beneath the water level. Surrounding combustion tube 22 is a shroud or baffle 23 having its lower end projecting downwardly below the lower end of the combustion tube. Both the combustion tube and shroud are secured to hood 24 which is attached around manifold 13. At the upper end of shroud 23 are openings 25 to allow outflow of hot gases and water into the atmosphere above the water level.

The burner may be ignited by an ignition device 26 or manually by tipping the combustion unit out of the water, depressing the safety valve and igniting the fuel-air mixture at the end of the combustion tube with a spark or flame. Once ignited the burner is lowered into the water for operation. Hot combustion gases and oil-in-water emulsion, heated rapidly thereby, flow upwardly in the annular space between shroud 23 and combustion tube 22. The hot combustion gases rising to the surface form an air lift that pumps the emulsion over the top of the shroud and out through openings 25 and provides a continuous supply of water for heat exchange. The annular space between the shroud and combustion tube should be large enough to allow free flow of water and long enough to obtain optimum heat exchange between the hot gaseous combustion products issuing from the lower end of the combustion tube into the body of water. In the apparatus shown in the drawings, for example, the combustion tube has an internal diameter of about 5½ inches. The baffle tube has an internal diameter of about 10½ inches and is about 21 inches long. Vaporization of the water and evaporation retarding chemical occurs in the annular space between the shroud and combustion tube.

The fuel-air ratio can be proportioned as desired by selection of an appropriately sized air orifice for the particular fuel nozzle used. Adjustment of the quantity of air can be made by controlling the pressure in air supply conduit 15. The apparatus illustrated is capable of operating at an air pressure of 24 inches of water where 5 to 6 inches of this pressure is due to the water head of the submerged burner.

OPERATION

To put the evaporation unit into operation the container 1 is filled with water to the appropriate water level indicated. The container shown is usually filled with about 30 gallons of water. The combustion unit is supported in place as shown in FIG. 1. Air and fuel are supplied to the burner nozzle through air supply conduit 15 and fuel injector nozzle 18. On ignition of the fuel-air mixture, the hot gaseous combustion products, principally carbon dioxide and water vapor along with nitrogen present in the air, are ejected through combustion tube 22 where they directly contact and heat water in container 1. The hot gases rise through the channel formed by the combustion tube and the shroud forming an air lift which raises the water up and over the top of the shroud through openings 26. As the water rises through the channel the heat of the combustion gases is transferred to the water.

A charge of evaporation retarding chemical, generally a water insoluble, monohydric fatty alcohol having 16 or more carbon atoms and an emulsifier are added to the water. The preferred evaporation retarding chemical, as has been mentioned, is n-hexadecanol which is a liquid at the operating temperatures employed. The quantity of fatty alcohol used is not critical. Preferably the hexadecanol, emulsifier, buffer and chelating agent, if needed, are combined together in a solid unit which is placed in the container. Once in the container the solid long chain fatty alcohol melts. The turbulence created by the flow of water up through the channel between the combustion tube and shroud mixes the n-hexadecanol throughout the water, the emulsifier assisting. The result is a uniform oil-in-water emulsion. The hot combustion gases and steam in close contact with the emulsified evaporation retarding chemical, causes vaporization of the evaporation retarding chemical and water in the annular space. By varying the amount of emulsifier or emulsifiers added to the water mixture the evaporation ratio of evaporation retarding chemical to water and thereby the coated fog drop size can be controlled. It has been noted that the coated fog drop size decreases as the amount of emulsifier increases. The ratio of the vapor pressures of the evaporation retarding chemical and water sets an upper limit to the evaporation ratio of the two materials. The mixture of evaporation retarding chemical vapor and water vapor flowing upwardly into the atmosphere condenses, the molecules of the chemical forming a compressed monomolecular layer around each of the water droplets, stabilizing them against rapid evaporation.

When used to protect orchards against frost damage units, such as that shown in FIG. 1, are placed at spaced intervals throughout the orchard. Flexible conduits are used to interconnect the air inlet supply conduits of each unit. A blower is used to supply air to all of the units. Fuel is supplied to each of the units through a common fuel line connecting to each of the inlet fuel conduits.

EXAMPLE 1

A series of combustion units having a configuration like that of FIG. 1 were placed in containers 1. Each of the containers was filled with water until the level of water was that indicated by reference numeral 2. The water level in each container was maintained by a float valve 4. Air at 24 inches of water pressure was furnished to each of the units from an air pump. Propane at 15 to 18 p.s.i. was furnished to each of the units. The fuel-air mixture in each of the units was ignited. Each unit operated smoothly and efficiently.

A charge of solid n-hexadecanol having admixed therewith appropriate amounts of buffer, emulsifying agent and sequestering agent, as needed, were added to the water in the containers of each of the units. The ratio of rates of evaporation (in moles per hour) of the water and the n-hexadecanol was equal to the ratio of their respective vapor pressures. The buffer, chelating agent and emulsifying agent did not evaporate to any appreciable extent.

When an emulsifying agent is used in the production of stable fogs of this invention the ratio of the rates of evaporation in moles per hour of the water and the n-hexadecanol is a function of the degree to which emulsification of the n-hexadecanol has taken place. The evaporation ratio thus depends upon the relative amounts of water, n-hexadecanol and emulsifier. Above a certain minimum relative amount of n-hexadecanol and emulsifier the evaporation ratio is equal to the ratio of vapor pressures of the water and n-hexadecanol. When sodium carbonate is used as an electrolytic emulsifier, the relative minimum amount of emulsifier, n-hexadecanol and water are; at least 4% by weight n-hexadecanol, at least 0.4% by weight sodium carbonate and the remainder water. When non-ionic water emulsifiers such as polyoxyethylene sorbitan mono-oleate (Tween 80) or polyoxyethylene fatty alcohol mixtures (Emulphor ON870) are used the relative amounts of emulsifier, n-hexadecanol and water are: at least 1% by weight n-hexadecanol, at least 0.4% by weight emulsifier, and the remainder water.

A specific composition of buffer, chelating agent, n-hexadecanol and electrolyte as emulsifying agent which may be used is (1) at least four weight percent chelating agent (disodium ethylenediaminetetra-acetate), (2) at least 10% sodium carbonate, and (3) the remainder n-hexadecanol.

The following organic emulsifiers and other materials can be added in the amounts stated to a water-alcohol mixture comprising about one pound of n-hexadecanol in about 30 gallons water to produce stable fogs.

(1) 20 grams "Tween 80" (polyoxyethylene sorbitan mono-oleate)
(2) 20 grams "Tween 80"
 5 grams triethanolamine (for pH control)
 2 grams Dow silicone AF10 antifoamant
(3) 20 grams "Emulphor ON870" (a polyoxyethylene fatty alcohol mixture)
(4) 20 grams "Tween 60" (polyoxyethylene sorbitan mono-stearate)
(5) 15 grams "Tween 21" (polyoxyethylene sorbitan mono-laurate)
 15 grams "Myrj 52" (polyoxyethylene stearate)
(6) 11 grams "Tween 21"
 19 grams "DM970" (dialkylphenoxy - polyethylene oxyethanol)
(7) 20 grams "DM970"
 10 grams CO430 (nonylphenoxy-polyethylene oxyethanol)
(8) 2.5 grams triethanolamine
 0.5 gram Dow Silicone AF10
 7.5 grams DM970 [1]
 2.1 grams CO430 [1]
 8.4 grams CO630 [1]

[1] Products of General Aniline and Film Corp.

The embodiments of the invention in which an exclusive property or privilege is claimed are defined as follows:

1. A method of producing stable water fogs by coating a multiplicity of water droplets with monomolecular films of a water-immiscible evaporation retarding chemical having the capability of hydrogen bonding with water, comprising:

directing hot gaseous combustion products resulting from the ignition of a fuel-air mixture into a mixture of water, evaporation retarding chemical and emulsifier capable of dispersing the evaporation retarding chemical in the water to form an oil-in-water emulsion, the mixture contained in a container open to the atmosphere, to produce a mixture of water vapor and evaporation retarding chemical vapor rising into the atmosphere from the container, the evaporation ratio of the evaporation retarding chemical to water and thereby the coated water drop size controlled by the amount of the emulsifier in the mixture, and condensing the vaporous mixture of water and evaporation retarding chemical by exposure to the ambient atmosphere surrounding the container, the molecules of the evaporation retarding chemical forming a compressed monolayer around each of the condensing water droplets, stabilizing them against rapid evaporation.

2. The method of claim 1 wherein the evaporation retarding chemical is a long chain monohydric fatty alcohol having the terminal hydroxyl group.

3. The method of claim 1 wherein the long chain fatty alcohol is n-hexadecanol.

4. The method of claim 1 wherein the emulsifier is one selected from the group consisting of organic anionic, cationic, and non-ionic surfactants, and mixtures thereof.

5. The method of claim 1 wherein the emulsifier is an inorganic electrolyte.

6. The method of claim 1 wherein the emulsifier is an organic emulsifier having a hydrophobic-lipophilic balance of between 14.5 and 15.5 when the evaporation retarding chemical is n-hexadecanol.

7. The method of claim 1 wherein the pH of the mixture is maintained at least at pH 7.

8. The method of claim 5 wherein the electrolyte is one selected from the group consisting of sodium carbonate, sodium borate, and mixtures thereof.

9. A method of producing stable water fogs by coating a multiplicity of water droplets with monomolecular films of a water-immiscible evaporation retarding chemical having the capability of hydrogen bonding with water, comprising:

combusting a fuel-air mixture, directing the combustion products, essentially water vapor, carbon dioxide and nitrogen contained in the inlet air stream downwardly through a combustion tube having its lower end immersed in a body of water open to the atmosphere containing an evaporation retarding chemical and an emulsifier capable of dispersing the evaporation retarding chemical in the water to form an oil-in-water emulsion, the combustion tube surrounded by a shroud defining an annular space therebetween, the shroud having spaced openings near the top and the lower end thereof extending below the water level and below the end of the combustion tube, heating the mixture of water, evaporation retarding chemical and emulsifier with the hot combustion gases as they flow upwardly in the annular space between the combustion tube and the shroud to evaporate the water and evaporation retarding chemical in an evaporation ratio controlled by the amount of emulsifier in the mixture and the respective vapor pressures of water and the evaporation retarding chemical, and condensing the vaporous mixture of water and evaporation retarding chemical by contact with the ambient atmosphere surrounding the container, the molecules of the evaporation retarding chemical forming a compressed monolayer around each of the condensing water droplets, stabilizing them against the rapid evaporation.

10. The method of claim 9 wherein the evaporation retarding chemical is a long chain, monohydric fatty alcohol having 16 or more carbon atoms.

11. The method of claim 9 wherein the long chain fatty alcohol is n-hexadecanol.

12. The method of claim 9 wherein the emulsifying agent is an inorganic electrolyte.

13. The method of claim 9 wherein the emulsifying agent is an organic anionic, cationic and non-ionic surfactant, or mixtures thereof.

14. The method of claim 9 wherein the water mixture is maintained at a pH of at least 7.

15. The method of claim 12 wherein the electrolyte is one selected from the group consisting of sodium carbonate and sodium borate, and mixtures thereof.

16. The method of claim 9 wherein the emulsifying agent is an organic emulsifying agent having a hydrophobic-lipophilic balance of between 14.5 and 15.5 when the evaporation retarding chemical is n-hexadecanol.

(References on following page)

References Cited

UNITED STATES PATENTS

| | | | |
|---|---|---|---|
| 2,451,019 | 10/1948 | Davis | 252—305 |
| 2,948,585 | 8/1960 | Fitzgibbon | 21—57 |
| 3,316,056 | 3/1967 | Johnson et al. | 252—305 |
| 3,330,069 | 7/1967 | Mihara | 47—2 |
| 3,654,175 | 3/1972 | Henderson | 252—305 |

OTHER REFERENCES

Thermal Research & Eng. Cp., Manual of Submerged Combustion (1961) Copy. 159/16A pp. 24–25.

Berkman et al., Emulsions and Foams, Reinhold, N.Y. (1941) TP156.66, p. 175.

Bennett, Practical Emulsions, Chem. Pub. Co., N.Y. (1943) p. 68.

Lang's Handbook 8th ed., pp. 434–5.

JOHN D. WELSH, Primary Examiner

U.S. Cl. X.R.

252—359 A; 47—2; 21—57